US010667455B2

(12) United States Patent
Gordon et al.

(10) Patent No.: US 10,667,455 B2
(45) Date of Patent: Jun. 2, 2020

(54) AUTOMATED DEPLOYMENT OF AUTONOMOUS DEVICES PERFORMING LOCALIZED ENVIRONMENT ALTERING ACTIONS

(71) Applicant: International Business Machines Corporation, Armonk, NY (US)

(72) Inventors: Michael S. Gordon, Yorktown Heights, NY (US); Clifford A. Pickover, Yorktown Heights, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/248,847

(22) Filed: Jan. 16, 2019

(65) Prior Publication Data

US 2019/0141879 A1  May 16, 2019

Related U.S. Application Data

(63) Continuation of application No. 15/155,288, filed on May 16, 2016, now Pat. No. 10,251,331.

(51) Int. Cl.
*A01B 79/00* (2006.01)
*A62B 99/00* (2009.01)
*G05D 1/10* (2006.01)
*G06Q 50/00* (2012.01)

(52) U.S. Cl.
CPC .............. *A01B 79/00* (2013.01); *A62B 99/00* (2013.01); *G05D 1/104* (2013.01); *G06Q 50/00* (2013.01)

(58) Field of Classification Search
USPC .......................................................... 701/25
See application file for complete search history.

(56) References Cited

U.S. PATENT DOCUMENTS

| 4,818,990 A | 4/1989 | Fernandes |
| 6,023,061 A | 2/2000 | Bodkin |
| 6,084,510 A | 7/2000 | Lemelson |
| 6,281,970 B1 | 8/2001 | Williams |

(Continued)

FOREIGN PATENT DOCUMENTS

WO    2014080387 A8    6/2014

OTHER PUBLICATIONS

"K-Means", Copyright 2009-2012 John McCullock, Printed Feb. 17, 2016, 3 pages, Mhttp://mnemstudio.org/clustering-k-means-introduction.htm>.

(Continued)

*Primary Examiner* — James M McPherson
(74) *Attorney, Agent, or Firm* — Stephanie L. Carusillo

(57) ABSTRACT

Embodiments of the present invention provide a method, computer program product, and a computer system for automated deployment of autonomous devices performing localized environment altering actions. A processor detects a set of weather conditions for a region, wherein the set of weather conditions includes at least temperature. A processor predicts whether the temperature will influence bodily functions of at least one organism of a plurality of organisms in the region. A processor dispatches one or more autonomous devices in response to predicting that the temperature will influence the bodily functions of the at least one organism of the plurality of organisms in the region.

19 Claims, 6 Drawing Sheets

(56) References Cited

U.S. PATENT DOCUMENTS

| | | | |
|---|---|---|---|
| 9,735,833 B2* | 8/2017 | Gross | H04B 3/54 |
| 2003/0029385 A1 | 2/2003 | Fransen | |
| 2010/0006034 A1 | 1/2010 | Van Den Berg | |
| 2010/0283662 A1 | 11/2010 | Fox | |
| 2012/0175468 A1 | 7/2012 | Zerof | |
| 2012/0265391 A1* | 10/2012 | Letsky | A01D 34/008 |
| | | | 701/25 |
| 2014/0277675 A1* | 9/2014 | Anderson | G05B 15/02 |
| | | | 700/114 |
| 2014/0277905 A1* | 9/2014 | Anderson | G07C 5/08 |
| | | | 701/29.3 |
| 2014/0316614 A1 | 10/2014 | Newman | |
| 2015/0210399 A1* | 7/2015 | Cox | B64D 15/16 |
| | | | 244/50 |
| 2015/0250137 A1 | 9/2015 | Palsgaard | |
| 2015/0274294 A1* | 10/2015 | Dahlstrom | B64D 1/18 |
| | | | 239/722 |
| 2015/0342150 A1 | 12/2015 | Womble | |
| 2015/0344136 A1* | 12/2015 | Dahlstrom | B64C 39/024 |
| | | | 701/3 |
| 2016/0356010 A1* | 12/2016 | Wilkinson | E01H 5/104 |
| 2017/0083018 A1 | 3/2017 | Womble | |
| 2017/0215405 A1 | 8/2017 | Kent | |
| 2017/0325444 A1 | 11/2017 | Crinklaw | |
| 2017/0326729 A1 | 11/2017 | Gros | |

OTHER PUBLICATIONS

Emrick et al., "Animals and Cold Weather", Countryside Conservancy Blog; Jan. 28, 2014, 4 pages, <http://www.cvcountryside.org/countryside-conservancy-blog/animals-and-cold-weather>.

Foulkes et al., "Livestock Management Ssytem", International Conference on Embedded Systems and Applications, Jul. 2013, pp. 3-9.

Mell et al., "The NIST Definition of Cloud Computing", Special Publication 800-145, Sep. 2011, 7 pages.

NDSU Extension, "Tips to help cattle cope with cold weather", Farm & Ranch Guide, Jan. 3, 2014, 2 pages, Mhttp://www.farandranchguide.com/news/livestock/tips-to-help-cattle-cope-with-cold-weather/article_28d62f6a-74c7-11e3-8b8a-001a4bcf887a.html>.

Gordon, et al., "Automated Deployment of Autonomous Devices Performing Localized Environment Altering Actions" U.S. Appl. No. 15/155,288, filed May 16, 2016.

List of IBM Patents or Patent Applications Treated as Related, Appendix P, Filed Herewith, 2 pages.

* cited by examiner

AUTOMATED DEPLOYMENT OF AUTONOMOUS DEVICES PERFORMING LOCALIZED ENVIRONMENT ALTERING ACTIONS

BACKGROUND

The present invention relates generally to the field of health and safety, and more particularly to an autonomous device-based emergency response system.

Technological advances continually push the bounds in order to provide earlier detection, and new techniques for alleviating life threatening conditions for the preservation of life, including humans, animals, and plants. One such condition is extreme temperatures, particularly that of extreme cold or extreme warm weather conditions. Specifically, extreme temperatures can create life threatening conditions for humans, animals, and plants alike.

SUMMARY

According to an aspect of the present invention, there is a method that preforms the following operations (not necessarily in the following order): (i) detecting, by one or more processor, a set of weather conditions for a region, wherein the set of weather conditions includes at least temperature. (ii) Prediction, by one or more processor, whether the temperature will have a negative effect on at least one organism in the region. (iii) Dispatching, by one or more processor, one or more autonomous devices in response to the prediction that the temperature will have a negative effect on at least one organism in the region. (iv) Receiving, by one or more processor, information regarding a first location of the at least one organism. (v) Recommending, by one or more processor, the one or more autonomous devices to perform at least one localized environment altering action to a first organism using at least one temperature altering element.

According to an aspect of the present invention, there is a computer program product that preforms the following operations (not necessarily in the following order): (i) program instructions to detect a set of weather condition for a region, wherein the set of weather conditions include at least temperature. (ii) Program instructions to predict whether the temperature will have a negative effect on at least one organism in the region. (iii) Program instructions to dispatch one or more autonomous devices in response to the prediction that the temperature will have a negative effect on at least one organism in the region. (iv) Program instructions to receive information regarding a first location of the at least one organism. (v) Program instructions to recommend the one or more autonomous devices to perform at least one localized environment altering action to a first organism using at least one temperature altering element.

According to an aspect of the present invention, there is a computer system that preforms the following operations (not necessarily in the following order). The computer system comprises one or more computer processors, and one or more computer readable storage media. Program instructions are stored on the one or more computer readable storage media for execution by at least one of the one or more processors. (i) Program instructions to detect a set of weather condition for a region, wherein the set of weather conditions include at least temperature. (ii) Program instructions to predict whether the temperature will have a negative effect on at least one organism in the region. (iii) Program instructions to dispatch one or more autonomous devices in response to the prediction that the temperature will have a negative effect on at least one organism in the region. (iv) Program instructions to receive information regarding a first location of the at least one organism. (v) Program instructions to recommend the one or more autonomous devices to perform at least one localized environment altering action to a first organism using at least one temperature altering element.

DETAILED DESCRIPTION

Figure 1:
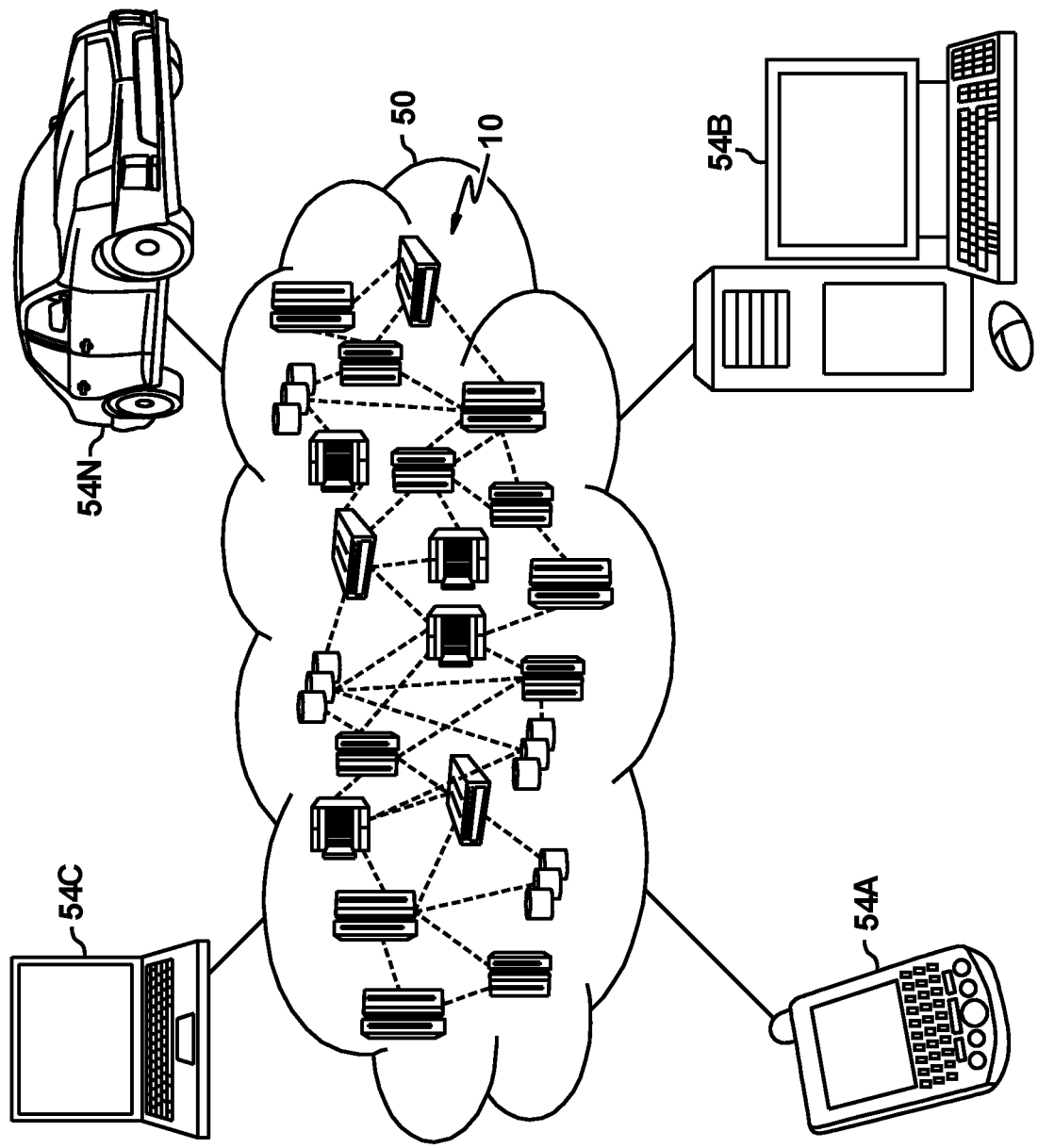
FIG. 1 depicts a cloud computing environment, according to an embodiment of the present invention.

Embodiments of the present invention detect and travel to locations where potentially lifesaving actions are needed during extreme weather conditions, providing humans, animals, and plants with a better chance to survive various weather elements. Furthermore, when a human, animal or plant is detected, embodiments of the present invention provide various alleviation techniques during a life-threatening weather condition in order to preserve life.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
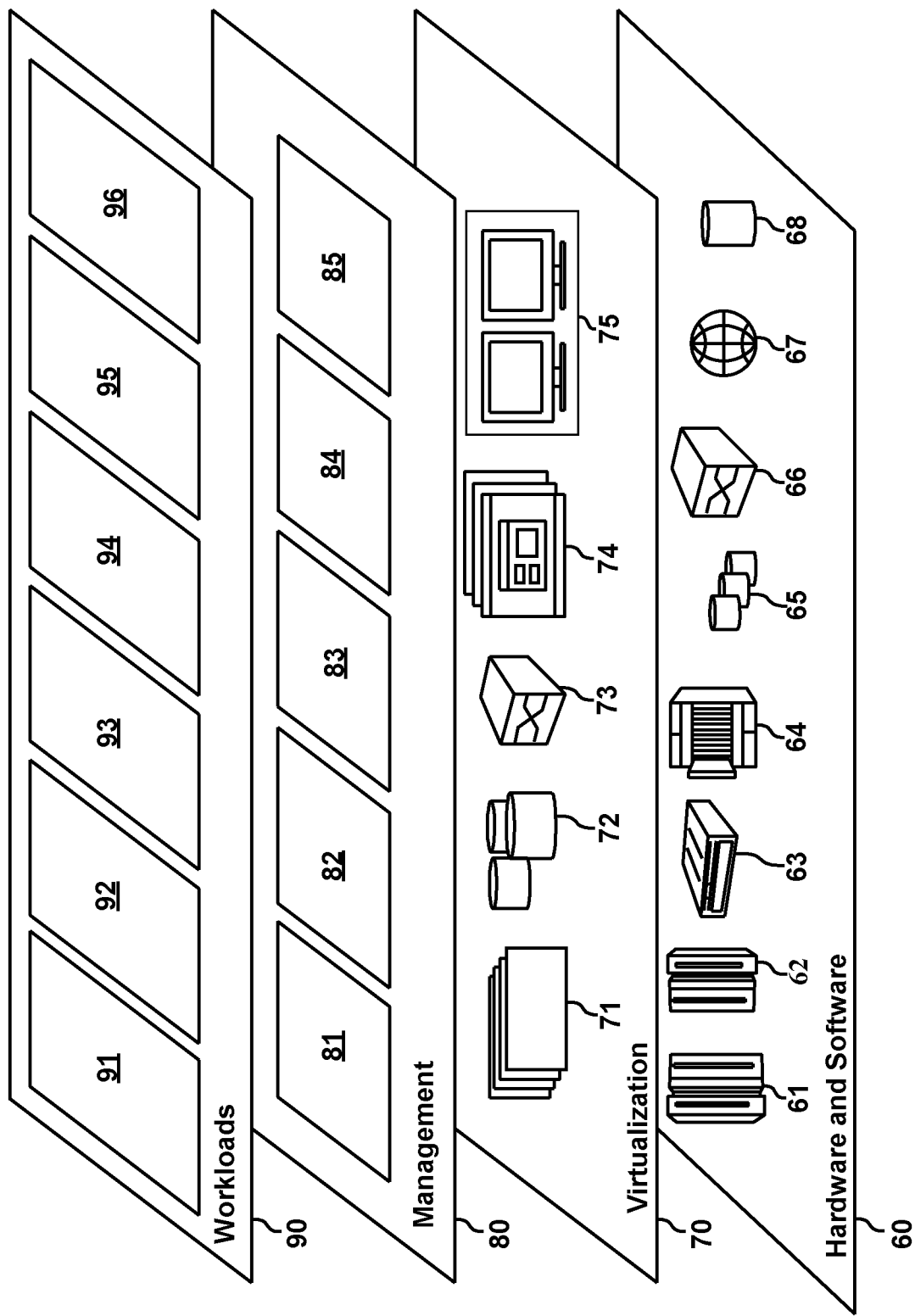
FIG. 2 depicts abstraction model layers, according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and weather forecasting.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
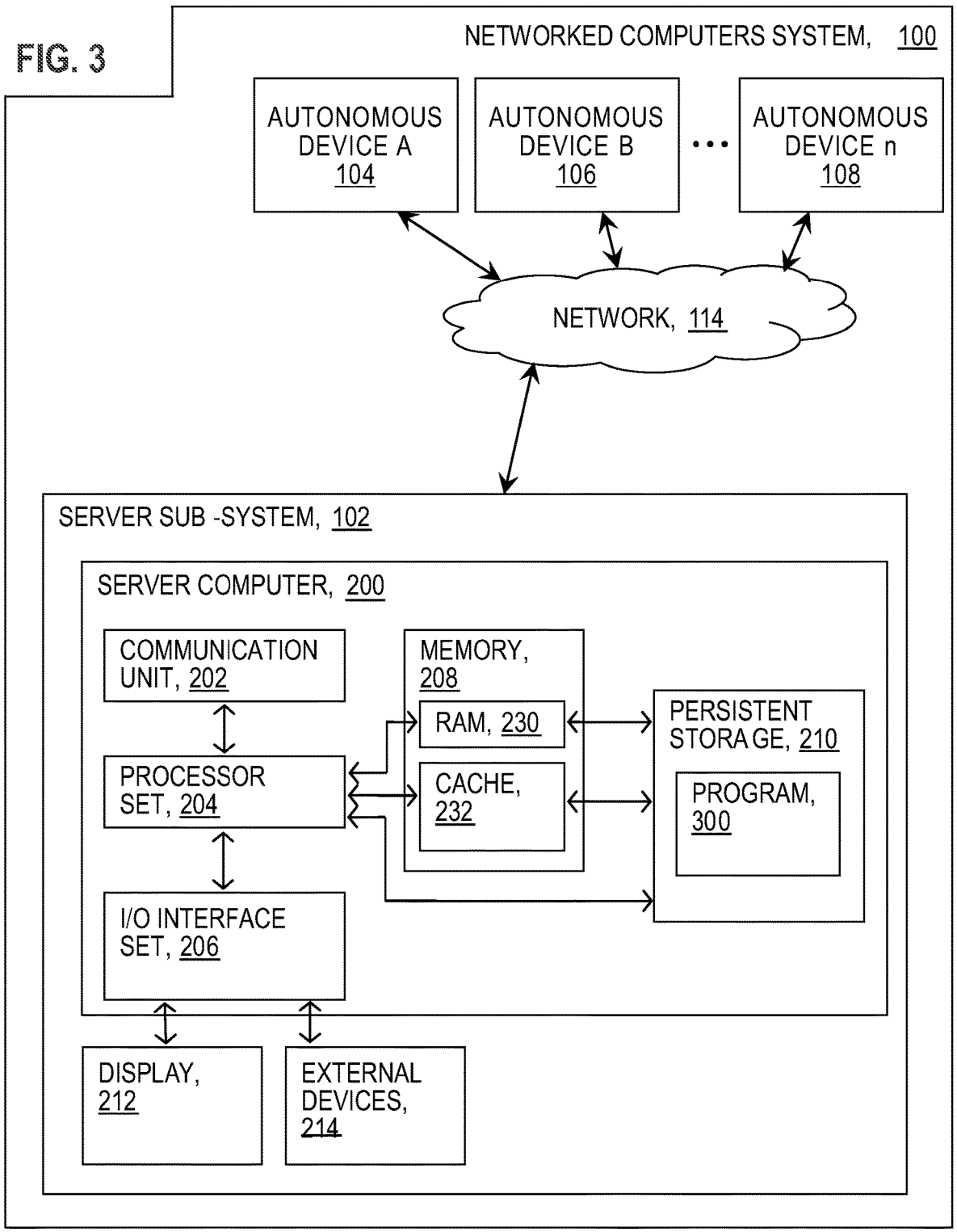
FIG. 3 is a block diagram view of a first embodiment of a system according to the present invention.

An embodiment of a possible hardware and software environment for software and/or methods according to the present invention will now be described in detail with reference to the Figures. FIG. 3 is a functional block diagram illustrating various portions of networked computers system 100, including: autonomous device A 104, autonomous device B 106 through autonomous device n 108; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Autonomous device A 104, autonomous device B 106 through autonomous device n 108, in many respects, represent any number of autonomous device units in communication to server sub system 102 through network 114. It is noted that the term autonomous device is not delimiting, rather, autonomous device may be, for example, an unmanned Arial vehicle (UAV), or an autonomous vehicle. Generally, an autonomous device, as used herein is a vehicle without a pilot on board, rather it is controlled through various systems of autonomy. Autonomous device A 104 through autonomous device n 108 offer a variety of the abilities ranging from sensing, computing power and automation.

Server sub-system 102 is, in many respects, representative of the various computer sub-system(s) in the present invention. Accordingly, several portions of server sub-system 102 will now be discussed in the following paragraphs.

Server Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Server Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Server Sub-system 102 is shown as a block diagram with many double arrows. These double arrows (no separate reference numerals) represent a communications fabric, which provides communications between various components of server sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for server sub-system 102; and/or (ii) devices external to server sub-system 102 may be able to provide memory for server sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to server sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 4:
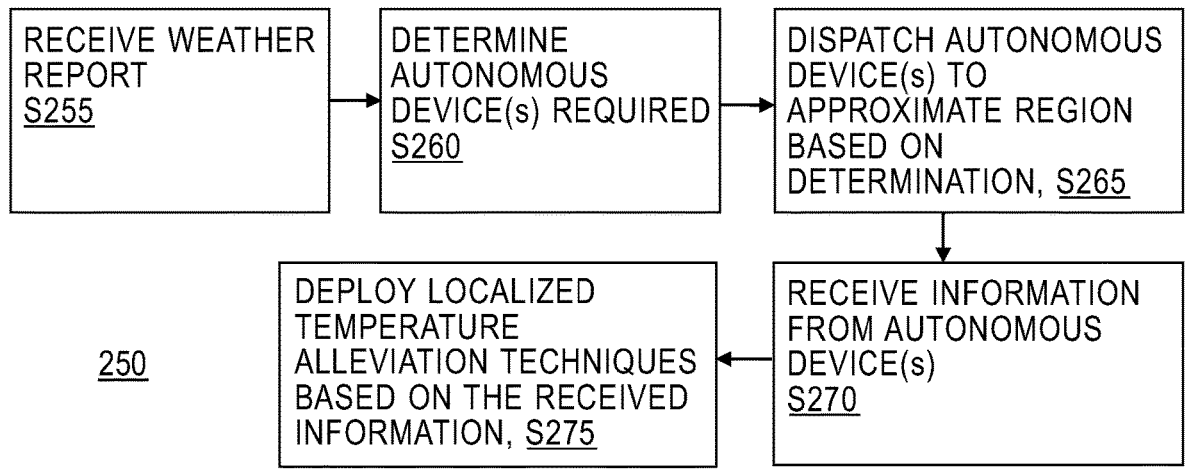
FIG. 4 is a flowchart showing a first embodiment method performed, at least in part, by the first embodiment system.
Figure 5:
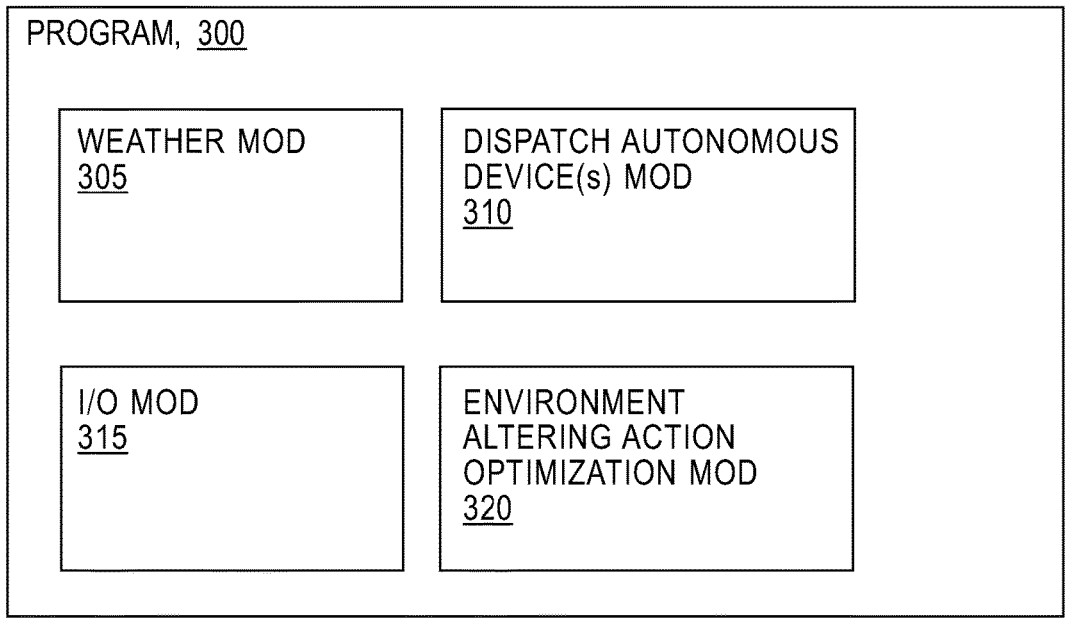
FIG. 5 is a block diagram showing a machine logic (for example, software) portion of the first embodiment system.

FIG. 4 shows flowchart 250 depicting a method (sometimes referred to as method 250) according to the present invention. FIG. 5 shows program 300 for performing at least some of the method operations of flowchart 250. This method, associated software, and processing modules will now be discussed, over the course of the following paragraphs, with extensive reference to FIG. 4 (for the method operation blocks) and FIG. 5 (for the software blocks). In this example embodiment (referred to in this sub-section as the "present example," the "present example embodiment," "the present embodiment," and the like), server computer 200 is adapted to detect and/or identify "objects" that are both living organisms and inanimate structures. For example, the invention may be implemented to detect living organisms which may include human beings, animals and/or plants. The invention may also be implemented to detect and/or identify inanimate structures, such as a car roof or sidewalk etc.

Processing begins at operation S255, where weather mod 305 (see FIG. 5) receives a weather report. In the present embodiment, only temperature is received by weather mod 305. In other embodiments, a weather warning of life threatening weather conditions for an area is received by weather mod 305. However, in other embodiments, any number of objects may be received. For example, weather mod 305 may receive and analyze meteorological weather reports to detect for potential life threatening weather conditions. In many embodiments (including embodiments discussed below in the Further Comments and/or Embodiments sub-section of this Detailed Description) a received weather warning may include extreme cold temperatures, and/or hot temperatures. However, this is not meant to be limiting, and method 250 may be used to process any number of weather conditions, and may also detect other occurrences of weather patterns which the autonomous devices may be equipped to protect and prevent any life threatening conditions for humans, animals, and/or plants. In the present embodiment, for example, weather mod 305 monitors and detects weather temperatures for dangerous life threatening cold weather which can cause hyperthermia, frostbite, death, and/or other life threatening conditions to humans, animals, and/or plants. Additionally, in the present embodiment, for example, weather mod 305 monitors and detects weather conditions for dangerous life threatening hot weather which can cause heatstroke, dehydration, heat exhaustion, and/or other life threatening conditions to humans, animals, and/or plants. Dangerous cold and hot temperatures may be abnormal based on the 'normal' temperature regime to which the organism is adapted too. Additionally, and/or alternatively, dangerous cold and hot temperatures may be determined based on common critical temperature determinations for living organisms in the region. Critical temperature may be the lowest (or highest) temperature that a living organism can tolerate to maintain its usual bodily functions. The critical temperature of living organisms can vary greatly, due to the 'normal' temperature regime to which organisms are adapted to. Further, the critical temperature can change based on various conditions; for example, if a mammal's skin, hair and/or fur is wet, its critical temperature rises.

Processing proceeds to step S260 and S265, where dispatch autonomous device(s) mod 310 determines whether autonomous devices are required, based on the analyzed weather report, and if autonomous devices are required, dispatch one or more autonomous devices to a general region, respectively. Specifically, dispatch autonomous device(s) mod 310 determines if and how many autonomous devices are needed based on the current and/or projected weather. Moreover, during the processing of dispatch autonomous device(s) mod 310, a determination is made based on the likelihood of life threatening conditions, to humans, animals, and/or plants, due to the weather, based on the information received from received weather report S255. The dispatch autonomous device(s) mod 310, may predict that a region is likely to have a living organism in or near it which would require assistance due to the weather. For example, in some embodiments, step S260, includes analyzing the weather, to determining if autonomous devices are needed, and if so how many autonomous devices to dispatch. In one specific embodiment, dispatch autonomous device(s) mod 310 may also identify at least one region where autonomous devices are needed, based on the weather conditions from weather mod 305. Additionally and/or alternatively, dispatch autonomous device(s) mod 310 may also identify at least one region where autonomous devices are needed, based on whether a living organism is predicted to be in the area with the weather conditions from weather mod 305. For example, the weather mod 305 describes a winter weather warning for a specific region, then dispatch autonomous device(s) mod 310 will determine if autonomous devices are required and the number of autonomous devices to dispatch, based on the likelihood of harm towards humans, animals (including livestock), and/or plants, due to the weather. For instance, if the region covers a highway, dispatch autonomous devices mod 310 may determine how many autonomous devices are necessary to cover the highway searching for stranded cars, based on the severity (and/or predicted severity) of the weather report. In another instance, if the region covers at least one farm, dispatch autonomous device(s) mod 310, may determine how many autonomous devices are necessary to cover the farms property in search of livestock in distress due to the weather. In another instance, if the region covers a forest, dispatch autonomous device(s) mod 310 may determine (1) whether autonomous devices are necessary for this region based on the weather, (e.g., based on the probability that humans are camping in the region, or the probability that animals are migrating in the region; etc.) and (2) how many autonomous devices are needed to search the area and/or provide localized environmental alterations.

Processing proceeds to step S270, where I/O mod 315 receives information from the sensors on the autonomous devices. After autonomous devices are dispatched, I/O mod 315 analyzes the received information from the autonomous devices sensors. Moreover, I/O mod 315 searches for approximate locations which may contain a human, animal, and/or plant based on the received information. Through the received information, I/O mod 315 searches for humans, animals, and/or plants in distress due to various weather conditions. In the present embodiment, I/O mode 315 may receive thermal images, infrared images, pressure sensors, geographic information, meteorological information, acoustic information, electric field information, rainfall, snowfall, ice accumulation, etc. However, in many embodiments, any type information may be received. In many embodiments (including embodiments discussed below in the Further Comments and/or Embodiments sub-section of this Detailed Description), the received information is from surveillance equipment attached to the autonomous devices. In many of these embodiments, the received information represents successive moments in time as the autonomous device travels in search of humans, animals, and/or plants.

Upon I/O mod 315 finding a human, animal, and/or plant, step S270 may also direct the autonomous device to the location the living organism(s) are detected. Through the received information, I/O mod 315 may direct the autonomous device to the location the human(s), animal(s), and/or plant(s) were detected. For example, if a surveillance sensor detects a living organism 5,000 feet due north of the autonomous device's current location, then, the autonomous devices navigation system may direct the autonomous device to the location (including avoiding obstacles in the autonomous device's path). In many embodiments (including embodiments discussed below in the Further Comments and/or Embodiments sub-section of this Detailed Description), the received information is continually updated from surveillance equipment, to accurately and methodically direct the autonomous device to the precise location, even if the living organism is also moving.

Upon I/O mod 315 finding a human, animal, and/or plant, step S270 may also receive information pertaining to various aspects of the living object. Through the received information, I/O mod 315 may determine if the living organism is in distress. Moreover, through the received information, I/O mod 315 may determine if the living organism is a human, animal, and/or plant. If the living object is an animal or plant, through the received information, I/O mod 315 may determine the breed/type of animal or plant, respectively. For example, using the received information, I/O mod 315 may determine that the living organism is a human. For example, if the living object is a plant on a farm, I/O mod 315 may receive information from a database depicting plant type(s) and location(s). Through various inputs, I/O mod 315 may sense and/or receive the average body temperature of a human, that of 98.6 degrees F. In another example, through the received information, I/O mod 315 may determine that the living organism is a horse. Further, I/O mod 315 may even determine the breed of horse such as a Clydesdale horse. Thereafter, I/O mod 315 may receive the average body temperature of a Clydesdale horse. Further, I/O mod 315 may receive additional information regarding the living organism, such as the animal's critical temperature, temperature hardiness (the ability for the living organism to withstand different temperatures), and the like.

Further, through the received information, I/O mod 315 may determine the health of the living organism. For example, if the living organism is in distress due to the temperature. Moreover, I/O mod 315 may determine, based on the received information, the age of the living organism. For example, I/O mod 315 may determine if the living organism is old or young. Such information may be useful as elderly or young animals may have a lessened ability to withstand different temperature ranges than adult animals.

Processing proceeds to step S275, where environment altering action optimization mod 320 optimizes the deployment of localized environment temperature alleviation techniques to the human, animal, and/or plant in distress, due to the weather and received information. Environment altering action optimization mod 320 directs the autonomous devices to the localized area where an action is needed. Once in the localized area, the autonomous devices optimize the distribution of environment altering action in order to maximize its effectiveness. For example, an autonomous device utilizing IR temperature readings and behavioral measurements, may be guided to the human (or animal, or plant) in most need of a temperature change prior to attending to another.

Environment altering action optimization mod 320 determines how and where to deploy the localized environment temperature alleviation techniques. In an embodiment, an on board processor analyzes the data from the autonomous device's sensors. In an embodiment, a cloud based system analyzes the data from one or a collection of autonomous device's sensors.

Further, environment altering action optimization mod 320 may predict future activity of the entities being provided with localized environment temperature alleviation. Utilizing a noise tolerance time-varying factor graph, an autonomous device may predict movements of the humans, and/or animals. For example, environment altering action optimization mod 320 may predict movements of the entities based on the formation of groupings and/or movements. Thereby, based on the predicted movements of the living entities, the autonomous devices may follow and provide continual environment alleviation.

Further, environment altering action optimization mod 320 may predict whether environment altering action is needed based on the received information during step S270. For example, if I/O mod 315 determines the health of the living organism is in distress, due to the temperature, environment altering action optimization mod 320 may provide alleviating actions. Alternatively, if I/O mod 315 determines the health of the living organism is within a satisfactory range, environment altering action optimization mod 320 may still provide alleviating actions. For instance, if I/O mod 315 detects an older animal exposed to temperatures below its critical temperature, the environment altering action optimization mod 320 may determine that the animal requires heat, even if the animal does not portray signs of distress, or suffering.

Moreover, in step S275, environment altering action optimization mod 320 may determine various groupings for the humans and/or animals utilizing, for example, a K-Means clustering calculation. Referencing FIGS. 6A and 6B, based on the number of autonomous devices dispatched, each autonomous device may focus on providing environment altering actions to a smaller portion of the whole. The grouping may be accomplished by minimizing the sum of squared distances (Euclidean distances) between items and a corresponding centroid. Determining an initial cluster may be accomplished by at least three different methodologies. Utilizing a Dynamically Chosen Cluster, the initial cluster may be the first few items of data from a set. This method is ideal with the amount of data (i.e., humans and/or animas) is expected to grow. For instance, if the data will be grouped in three clusters, then the initial cluster means will be the first three items of data. Alternatively, in a Randomly Chosen Cluster, the initial cluster means are randomly chosen values within the same ranges as the highest and lowest of the data values. The third methodology of determining an initial cluster depends on the type of data in the set. Generally the highest and lowest of the data ranges are chosen as the initial cluster. Alternatively, the extremities are chose as the initial cluster. This methodology is referred to as the upper and lower bounds.

Figure 6A:
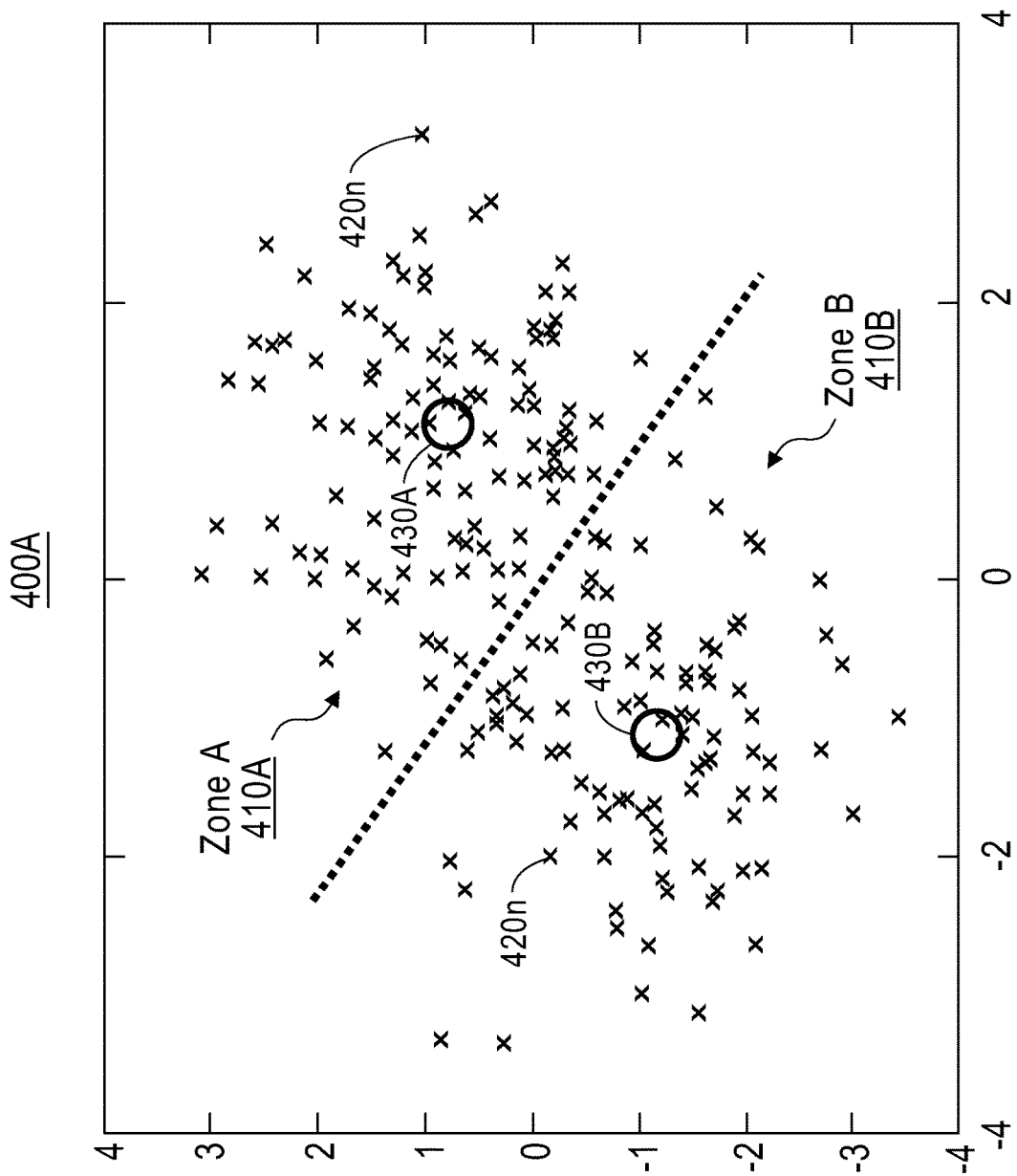
FIGS. 6A and 6B are exemplary diagrams showing information that is helpful in understanding the optimization of environment altering actions of the first embodiment of the present invention.

Reference is made to now FIG. 6A. FIG. 6A depicts a cluster of living organisms, 420n. For example, environment 400A represents a herd of cattle where each black dot is a cow 420n. Environment 400A portrays two autonomous devices dispatched to provide localized environment altering action to the entire herd. In step S275, utilizing a K-Means algorithm, the autonomous devices divide the herd into two separate groupings, Zone A 410A; and Zone B 410B. Each autonomous device determines the centroid of each grouping. Generally, a centroid is the arithmetic average position of all the points in a shape. Defined another way, a centroid is the point at which an infinitesimally thin cutout of the shape could be perfectly balanced on the tip of a pin. The centroid is the center of each grouping, where the centroid is based on the herd providing the autonomous device with the optimal ability to provide a localized environment altering action. As depicted in environment 400A, centroid 430A is the centroid of Zone A 410A; and centroid 430B is the centroid of Zone B 410B.

Figure 6B:
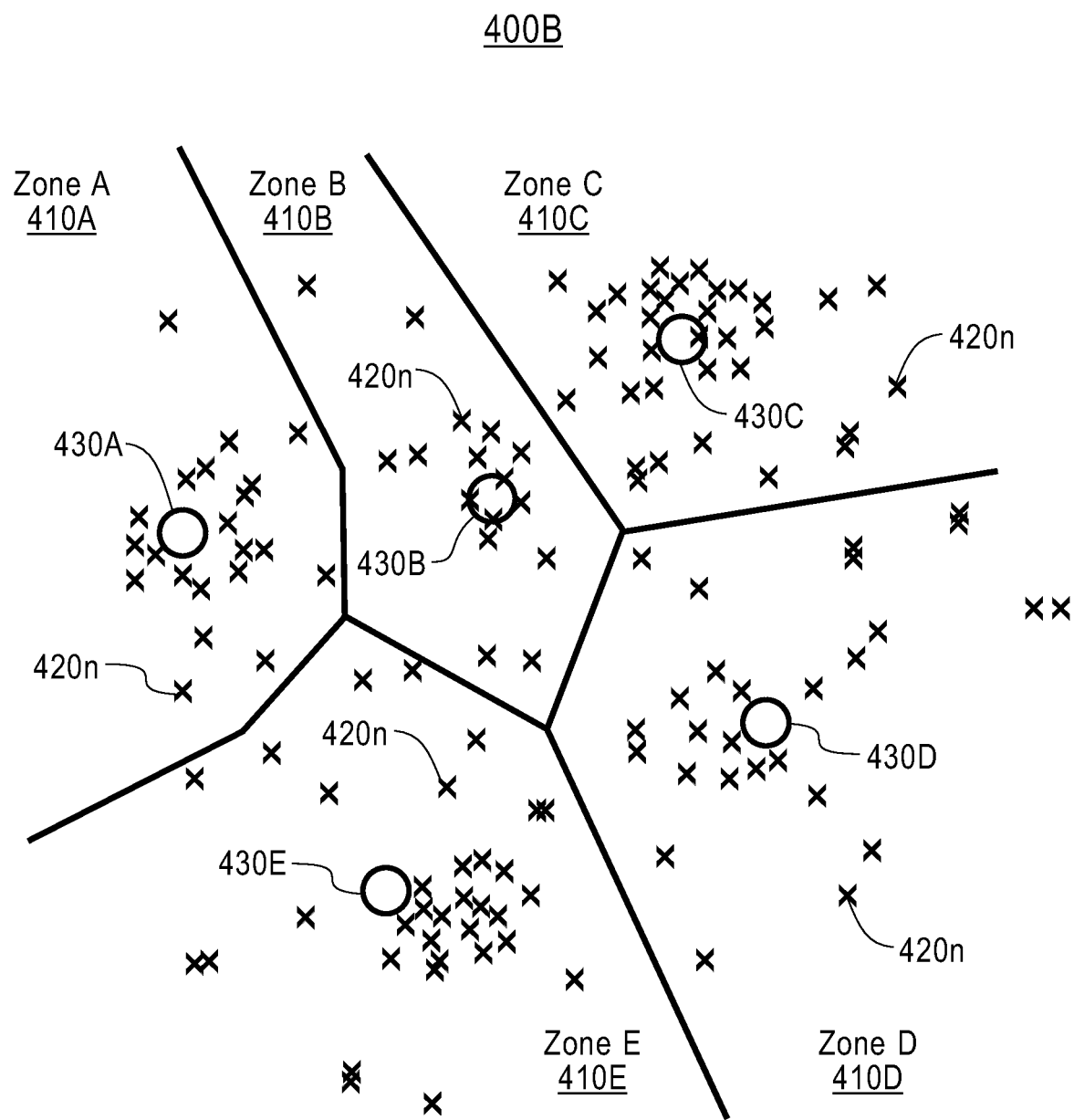

Reference is now made to FIG. 6B. FIG. 6B depicts a cluster of living organisms, 420*n*. For example, environment 400B represents a herd of cattle where each black dot is a cow 420*n*. Environment 400B portrays 5 autonomous devices dispatched to provide localized environment altering action to the entire herd. In step S275, utilizing a K-Means algorithm, the autonomous devices divide the herd into 5 separate groupings, Zone A 410A; Zone B 410B; Zone C 410C; Zone D 410D; and Zone E 410E. Each autonomous device, determines the centroid of each grouping. As depicted in environment 400B, centroid 430A is the centroid of Zone A 410A; centroid 430B is the centroid of Zone B 410B; centroid 430C is the centroid of Zone C 410C; centroid 430D is the centroid of Zone D 410D; and centroid 430E is the centroid of Zone E 410E.

Centroids generally define a potential effective location of an autonomous device to provide localized environmental alterations. In an embodiment, as the herd of cattle move, the centroids may move. Moreover, in embodiment, as the herd of cattle move, the clusters may change. Furthermore, if an autonomous device senses a human or animal in distress the autonomous device may leave the centroid in order to provide localized environmental alterations directed at that specific living entity. In an embodiment, if an autonomous device departs form the centroid, the other autonomous devices may deviate from the determined k-means clustering and readjust the clustering.

In an embodiment, environment altering action optimization mod 320, may determine the type of localized environment altering action is required for the human, animal and/or plant. If, for example, it is determined that an animal and/or human is in distress due to cold weather, an autonomous device may provide heat (from a heater) for warmth, and/or direct a stream of air onto the animal to blow off snow accumulation. In another example, an autonomous device may navigate around the cattle in a field and herd the cattle into a larger group thereby allowing the animal's body heat to warm the heard. Similarly, if the autonomous devices detect a stranded car on the side of the road with humans in it, the autonomous devices may heat the car and/or direct a stream of air onto the roof of the car blowing off snow accumulation.

If, for example, it is determined that an animal and/or human is in distress due to hot weather, an autonomous device may provide cooling air. In another example, an autonomous device may spray a mist on the animal and/or human is in distress due to hot weather to assist in cooling its body temperature.

Some embodiments of the present invention recognize the following facts, potential problems and/or potential areas for improvement with respect to the current state of the art: (i) protecting humans and livestock during cold temperatures; (ii) protecting humans and livestock during hot temperatures; (iii) discovering humans and animals in distress due to the weather; and (iv) increasing the efficiency of environment altering actions.

Embodiments of the present invention may include one or more of the following features: (i) avoiding an animal from reaching its critical temperature; (ii) preventing the onset of hyperthermia when temperature falls below a critical temperature of a species of animal or human; (iii) deploying the optimal amount of heat when and where needed; (iv) preventing ailments such as heatstroke or dehydration, which occur when an animal or plant overheats; (v) deploying the optimal amount of relief when and where needed; and (vi) deploying a tarp to cover sensitive plants.

Some embodiments of the present invention may include one, or more, of the following features, characteristics and/or advantages (i) determining heat is needed in a general area; (ii) sensing where heat is needed; (iii) guiding heat to a region of need; (iv) identifying various aspects of animal and/or livestock; and (v) optimizing heat distribution over an area.

Embodiments of the present invention monitor extreme weather conditions for dangerous life threatening cold weather which can cause hyperthermia, frostbite, death and/or other life threatening conditions to humans, animals and/or livestock.

In some embodiments according to the present invention an autonomous device may be equipped with: (i) a heating element; (ii) a fan; (iii) sensors to determine where heat is needed; (iv) a navigation system to automatically move to a region of need; and (v) meteorological equipment. Additionally, embodiments of the present invention may also include deep neural nets and/or behavioral monitoring capabilities.

In some embodiments according to the present invention an autonomous device may need to be large enough to carry a heater capable of heating a sufficient area. In these embodiments, the type of heater and the amount of heat output may determine the size of the autonomous device utilized. For example, using a ceramic electric resistant heater to heat a herd of cattle may require a large UAV, whereas a UAV equipped with a laser heater may be substantially smaller, in comparison.

In some embodiments of the present invention, the autonomous device carrying the heat source may be remotely located where it is necessary to travel to the location(s) which require heat. In these embodiments, the autonomous device is capable of traveling by means of air, ground or water. In other embodiments of the present invention, the autonomous device may be local. In these embodiments, the autonomous device may be tethered to a location and travel a short distance to the location(s) which require heat. The tether may contain electricity or other means of powering the autonomous device, within the local area. For example, an electricity powered autonomous device having a retractable power cord tether, may be deployed, depending on the tether length and the distance needed to travel i.e., for short, medium or long distances.

In some embodiments according to the present invention autonomous devices may provide a fan as well as a heater. For example, when there is a light snow cover, the 'prop wash' from the autonomous devices, or an external fan, should be effective at blowing snow off of: (i) livestock; (ii) humans; (iii) roofs of homes, cars, large trucks, etc.; and/or (iv) sidewalks. For instance, the autonomous device(s) could be deployed several times during a snow storm thereby minimizing the snow burden.

Some embodiments of the present invention may utilize (i) a single autonomous device; and/or (ii) a fleet of autonomous devices. When multiple autonomous devices are available, to enhance heating capabilities, the autonomous devices may be dispatched in waves, allowing a portion of the autonomous devices to (i) travel to/from the desired target; (ii) provide heat to the desired target; and (iii) recharge/refuel, as needed.

In some embodiments of the present invention, the autonomous device may be powered by a variety of sources, including, but not necessarily limited to: (i) gasoline; (ii) natural gas; (iii) atomic/nuclear battery; (iv) battery; (v) a tethered electrical supply; (vi) solar; (vii) magnetic; (viii) turbine; (ix) fuel cells; (x) solid hydrogen storage; and (xi) other power sources known in the art.

In some embodiments of the present invention, the autonomous device may be powered by two separate power sources. For example, a first power source may be used to power the autonomous device's mechanism for flight, while a second power source is used to power the heating element.

In some embodiments according to the present invention an autonomous device may need to operate at a slow speed, while remaining airborne. In these embodiments, the autonomous device may need to operate at a standstill, or near standstill, in order to provide the optimal heat over its target. The autonomous device may operate at standstill utilizing known methods in the art, such as a helicopter.

In some embodiments according to the present invention an autonomous device may have to operate at relatively low altitudes. In these embodiments, the autonomous device will have to avoid persons, structures, terrain and animals. The autonomous device may operate at low altitudes utilizing known methods in the art, such as utilizing radar and IR to detect and avoid obstacles.

In some embodiments according to the present invention an autonomous device may be preprogrammed with a route in order to avoid obstacles. In other embodiments according to the present invention an autonomous device may automatically determine a flightpath to its intended target while avoiding obstacles.

In some embodiments according to the present invention an autonomous device may without substantial human intervention, may accomplish its tasks without substantial human intervention. Generally, without substantial human intervention is a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

In some embodiments according to the present invention an autonomous device will have a variety of navigational sensors, including but not limited to: (i) global positioning system (GPS); (ii) infrared (IR) measurements; (iii) motion sensors (for example accelerometers and gyroscopes); (iv) thermal imaging; and (v) additional sensors known in the art.

In some embodiments according to the present invention an autonomous device will have a variety of sensors to sense where heat is needed, including but not limited to: (i) thermal measurements (for example, if the body temperature drops below a thresh hold); (ii) IR measurements (iii) cameras; (iv) electric field sensing; and (v) acoustic sensors. Further, in some embodiments according to the present invention an autonomous device may receive from a transmitter information regarding livestock vitals. For example, those skilled in the art appreciate that information concerning livestock's vitals may be transmitted to a centralized location. For instance, certain ear tags on livestock may transmit information concerning an animals vitals including, but not limited to core temperature, heart rate, and blood oxygen levels. Additionally, in some embodiments according to the present invention an autonomous device may detect motion of an animal and compare the motion to that of its herd as an indication of stress. For instance, if a particular animal is moving at a different pace than herd, then the autonomous device may determine to apply heat to the animal moving at a different pace.

In these embodiments an autonomous device will be able to sense, at least the following (i) locations of humans and or animals; (ii) density of humans and or animals in a given area; (iii) amount of snow coverage; and/or (iv) humidity; (v) wind speed; (vi) sounds (for example, sounds of stress, abnormal lack of sound); (vii) motion and (viii) crowd pressure (determined based on the density of living organisms multiplied by variance of speeds of the living organisms).

In some embodiments according to the present invention an autonomous device will have an IR camera attached to the autonomous device. In these embodiments the camera may include (i) a two dimensional focal plane array (FPA); (ii) a compound lens for imaging IR radiation onto the FPA; (iii) a means for adjusting the distance between the lens and the FPA to adjust focus; (iv) an electronic module controlling various aspects of the camera such as the camera read out, calibration, signal processing, etc.; and (v) a means for flexibly coupling the FPA to the module.

In some embodiments according to the present invention when the autonomous device is attempting to determine how and where to deploy the heat from its heating element, the autonomous device may make use of an on board analysis of images that may be collected and categorized. In some embodiments according to the present invention when the autonomous device is attempting to determine how and where to deploy the heat from its heating element, the autonomous device may make use of a cloud based analysis of images that may be collected and categorized. Various regions of concern may be determined automatically. Such regions of concern may be detected by: (i) detecting cold spots near animals; (ii) determining an open barn door is partially or fully open; (iii) detecting a stalled car on the side of the road; (iv) detecting power outages in populated area, etc.

In some embodiments according to the present invention the autonomous device is may predict whether to deploy the heat from its heating element. For example, utilizing various sensors, the autonomous device may detect certain characteristics of an animal and predict that heat is needed. For instance, if the autonomous device detects a young animal exposed to temperatures below its critical temperature, the autonomous device may determine that the animal requires heat, even if the animal does not portray signs of distress, or suffering.

In some embodiments according to the present invention the variety sensors are capable of detecting and distinguishing various animals such as: cows, pigs, sheep, chicken turkeys and bees in a hives, etc. Additionally some embodiments according to the present invention the sensors may also be capable to assess the nature of an animal. The nature of an animal may be expressed as: (i) species; (ii) age (young v. adult v. elderly); and/or (iii) healthy or sick; etc. The nature of an animal may be determined based on deep neural nets. Alternatively, and/or additionally, the nature of an animal may be further determined by visual identification assisted by a video feed from an autonomous device to a remote observer (e.g. farmer or veterinarian).

Further, embodiments according to the present invention may detect the health of a living organism of based on the detection of (i) external parasites; (ii) skin lesions, and/or (iii) unhealthy skin features. For example, neural nets may be used to detect skin rashes, and/or identify parasites based on body shape and color, etc. For instance, external parasites may be inferred based on the autonomous devices detection of (i) itching behavior/skin irritations (causing animals to scratch, rub, and bite infested areas, for example, constant rubbing against fencing or equipment); (ii) thickened skin; (iii) hair loss; (iv) rough hair coat; (v) lack of appetite; (vi) poor weight gain; (vii) depression; (viii) lethargy; and (ix), lesions.

Further, embodiments according to the present invention may determine the age of a living organism based on the size of the organism. For example, by comparing the size of the detected living organism to other similar organisms, an approximate age may detected.

In some embodiments according to the present invention the autonomous devices may be dispatched to open spaces where humans are gathering. For example, groups of persons, especially at large events (i.e., parties, concerts, etc.) tend to move around. As such, people's behavior and group formation varies over time. Therefore, in some embodiments according to the present invention the autonomous devices should be capable of tracking and even predicting user activity, thereby determining where heat should be placed next.

In some embodiments according to the present invention an autonomous device may utilize k-means clustering to group the targets requiring heat in a certain number of optimal groups. For example, if multiple autonomous devices are dispatched, using k-means clustering, the target subdivided into smaller number groups allowing each autonomous device to heat a specific subgroup. Clustering may be utilized to minimize the sum of squared distances between the target and the corresponding centroid, the center of the group. For instance, two or more autonomous devices, may create two or more clusters of animals or humans, and provide heat in the center of each segment, thereby enhancing heat distribution to the targets.

Generally k-means clustering generates groupings by one of three methods: (i) dynamically chosen; (ii) randomly chosen; or (iii) choosing an upper and lower bounds. Dynamically chosen method is ideal when the amount of data (animals and/or humans) is expected to increase. Thereby the initial cluster means can simply be the first few items of data from the set. For instance, if the data will be grouped into three clusters, then the initial cluster means will be the first three items of data. Randomly chosen method is based on where an initial cluster means are randomly chosen values within the same range as the highest and lowest of data values. Choosing from upper and lower bounds is dependent on the type of data in the set. The highest and lowest values of the data range are chosen as the initial cluster means. For example, the highest and lowest values may be the extremities of the data set.

In some embodiments according to the present invention an autonomous device may utilize Noise Tolerant Time-varying Factor Graphs. Such graphs may be utilized to track and/or predict user activity, formation of cliques and demand where heat should be placed next.

What is claimed is:

1. A method comprising:
   detecting, by one or more processors, a set of weather conditions for a region, wherein the set of weather conditions includes at least temperature;
   predicting, by the one or more processors, whether the temperature will influence bodily functions of at least one organism of a plurality of organisms in the region;
   determining, by the one or more processors, that the temperature will influence bodily functions of the at least one organism of the plurality of organisms in the region by causing life threatening conditions to the at least one organism of the plurality of organisms in the region based on comparing a current body temperature of the at least one organism to a normal temperature range of the at least one living organism; and
   dispatching, by the one or more processors, one or more autonomous devices in response to determining that the temperature will influence the bodily functions of the at least one organism of the plurality of organisms in the region.

2. The method of claim 1, further comprising:
   receiving, by the one or more processors, information regarding a first location of the at least one organism of the plurality of organisms in the region; and
   recommending, by the one or more processors, the one or more autonomous devices to perform at least one localized environment altering action to a first organism of the plurality of organisms in the region using at least one temperature altering element.

3. The method of claim 2, further comprising:
   identifying, by the one or more processors, a first type of weather temperatures and precipitation from the set of weather conditions, wherein the first type of weather temperatures cause hyperthermia and frostbite; and
   determining, by the one or more processors, the at least one localized environment altering action is to provide heat to the at least one organism of the plurality of organisms in the region.

4. The method of claim 1, further comprising:
   detecting, by the one or more processors, an accumulation of snow on an entity, wherein the entity is at least a sidewalk, a roof, or a back of an animal; and
   responsive to detecting the accumulation of snow, directing, by the one or more processors, the one or more autonomous devices to provide an airstream to move the accumulation of snow away from the entity.

5. The method of claim 2, wherein the recommending the one or more autonomous devices to perform the at least one localized environment altering action to the first organism of the plurality of organisms in the region, comprises:
   detecting, by the one or more processors, at least one grouping of organisms including the at least one organism of the plurality of organisms in the region, wherein the at least one living organism of the plurality of organisms in the region comprises one of the following: an animal, a human, and a plant; and analyzing, by the one or more processors, the first location of the at least one organism of the plurality of organisms in the region, based in part on determining a centroid and k-means clustering of the at least one grouping of organisms.

6. The method of claim 1, further comprising:

utilizing, by the one or more processors, a set of sensors residing within the one or more autonomous devices, wherein the set of sensors are selected from the group consisting of:

a camera; global positioning system (GPS); an infrared (IR) sensor; pressure sensors; thermal imaging; electric field sensing; and acoustic sensors.

7. The method of claim 2, further comprising:

receiving, by the one or more processors, information regarding a second location of the at least one organism of the plurality of organisms in the region;

recommending, by the one or more processors, the one or more autonomous devices to perform a second at least one localized environment altering action at the second location using at least one temperature altering element.

8. The method of claim 2, further comprising:

detecting, by the one or more processors, at least two organisms of the plurality of organisms in the region within in the first location;

determining, by the one or more processors, at least an age or health of each organism of the plurality of organisms in the region; and providing, by the one or more processors, the at least one localized environment altering action to an organism determined to be weakest of the plurality of organisms of the region, based, at least in part, on the age and health of the at least two organisms of the plurality of organisms of the region.

9. The method of claim 1, further comprising:

determining, by the one or more processors, that the temperature will cause life threatening conditions to the at least one organism of the plurality of organisms in the region, based, at least in part, on received information from a set of sensors on the one or more autonomous devices.

10. The method of claim 1, further comprising:

determining, by the one or more processors, that the temperature will cause life threatening conditions to the at least one organism of the plurality of organisms in the region based, at least in part, on a behavioral monitor.

11. The method of claim 2, further comprising:

predicting, by the one or more processors, movement of the at least one organism of the plurality of organisms in the region to determine a second location to provide the at least one localized environment altering action, based in part on noise tolerant time-varying factor graphs.

12. The method of claim 2, further comprising:

identifying, by the one or more processors, a second type of weather temperatures from the set of weather conditions, wherein the second type of weather temperatures cause heat strokes, dehydration, and heat exhaustion;

determining, by the one or more processors, the at least one localized environment altering action is to provide cooling to the at least one organism of the plurality of organisms in the region.

13. The method of claim 1, further comprising:

determining, by the one or more processors, at least one characteristic of the at least one organism of the plurality of organisms in the region based, at least in part, on a deep neural network, wherein the at least one characteristic comprises one of the following:

a species of the least one living organism, an age category of the least one living organism, and a health status of the least one living organism.

14. A computer program product comprising:

a computer readable storage device and program instructions stored on the computer readable storage device being executed by a processor, the program instructions comprising:

program instructions to detect a set of weather conditions for a region, wherein the set of weather conditions include at least temperature;

program instructions to predict whether the temperature will influence bodily functions of at least one organism of a plurality of organisms in the region, wherein the bodily functions are influenced by a temperature range of the at least one organism of the plurality of organisms in the region;

program instructions to determine that the temperature will influence bodily functions of the at least one organism of the plurality of organisms in the region by causing life threatening conditions to the at least one organism of the plurality of organisms in the region based on comparing a current body temperature of the at least one organism to a normal temperature range of the at least one living organism; and program instructions to dispatch one or more autonomous devices in response to determining the temperature influence the bodily functions of the at least one organism of the plurality of organisms in the region.

15. The computer program product of claim 14, further comprising:

program instructions to receive information regarding a first location of the at least one organism of the plurality of organisms in the region; and program instructions to recommend the one or more autonomous devices to perform at least one localized environment altering action to a first organism of the plurality of organisms in the region using at least one temperature altering element.

16. The computer program product of claim 15, wherein the program instructions to recommend the one or more autonomous devices to perform the at least one localized environment altering action to the first organism of the plurality of organisms in the region comprise:

program instructions to detect at least one grouping of organisms including the at least one organism of the plurality of organisms in the region, wherein the at least one organism of the plurality of organisms in the region comprises one of the following: an animal, a human, and a plant; and program instructions to analyze the first location of the at least one organism of the plurality of organisms in the region, based in part on determining a centroid and k-means clustering of the at least one grouping of organisms.

17. The computer program product of claim 14, further comprising:

program instructions to utilize a set of sensors residing in the one or more autonomous devices, wherein the set of sensors are selected from the group consisting of:

a camera; global positioning system (GPS); an infrared (IR) sensor; pressure sensors; thermal imaging; electric field sensing; and acoustic sensors.

18. A computer system comprising:
one or more computer processors;
one or more computer readable storage devices;
program instructions stored on the one or more computer readable storage devices for execution by at least one of the one or more computer processors, the program instructions comprising:
program instructions to detect a set of weather conditions for a region, wherein the set of weather conditions include at least temperature;
program instructions to predict whether the temperature will influence bodily functions of at least one organism of a plurality of organisms in the region, wherein the bodily functions are influenced by a temperature range of the at least one organism of the plurality of organisms in the region;
program instructions to determine that the temperature will influence bodily functions of the at least one organism of the plurality of organisms in the region by causing life threatening conditions to the at least one organism of the plurality of organisms in the region based on comparing a current body temperature of the at least one organism to a normal temperature range of the at least one living organism; and
program instructions to dispatch one or more autonomous devices in response to determining that the temperature will influence the bodily functions of the at least one organism of the plurality of organisms in the region.

19. The computer system of claim 18, further comprising:
program instructions to receive information regarding a first location of the at least one organism of the plurality of organisms in the region; and
program instructions to recommend the one or more autonomous devices to perform at least one localized environment altering action to a first organism of the plurality of organisms in the region using at least one temperature altering element.

* * * * *